US009313247B2

(12) United States Patent
Jefremov

(10) Patent No.: US 9,313,247 B2
(45) Date of Patent: Apr. 12, 2016

(54) METHOD OF TRANSMITTING DATA IN A COMMUNICATION SYSTEM

(75) Inventor: Andrei Jefremov, Järfälla (SE)

(73) Assignee: Skype, Dublin (IE)

( * ) Notice: Subject to any disclaimer, the term of this patent is extended or adjusted under 35 U.S.C. 154(b) by 863 days.

(21) Appl. No.: 12/004,450

(22) Filed: Dec. 20, 2007

(65) Prior Publication Data

US 2009/0089442 A1  Apr. 2, 2009

(30) Foreign Application Priority Data

Oct. 2, 2007  (GB) .................................. 0719233.9

(51) Int. Cl.
*G06F 15/16* (2006.01)
*H04L 29/06* (2006.01)

(52) U.S. Cl.
CPC ............ *H04L 65/602* (2013.01); *H04L 65/604* (2013.01)

(58) Field of Classification Search
CPC ................ H04L 65/604; H04L 65/602; H04L 29/08072; H04L 29/06
USPC .................................................. 709/227–229
See application file for complete search history.

(56) References Cited

U.S. PATENT DOCUMENTS

| 6,067,534 | A | | 5/2000 | Terho et al. | |
| 6,167,438 | A | * | 12/2000 | Yates | G06F 17/30902 707/E17.12 |
| 6,760,601 | B1 | * | 7/2004 | Suoknuuti | H04L 29/06 379/90.01 |
| 6,795,965 | B1 | * | 9/2004 | Yadav | 717/168 |
| 6,954,800 | B2 | * | 10/2005 | Mallory | 709/240 |
| 7,225,245 | B2 | * | 5/2007 | Gurumoorthy et al. | 709/223 |
| 7,363,054 | B2 | * | 4/2008 | Elias et al. | 455/556.1 |
| 7,373,395 | B2 | * | 5/2008 | Brailean et al. | 709/219 |
| 7,466,992 | B1 | * | 12/2008 | Fujisaki | 455/556.1 |
| 7,702,792 | B2 | * | 4/2010 | Shaffer et al. | 709/227 |
| 7,743,374 | B2 | * | 6/2010 | Machida | 717/176 |
| 7,899,915 | B2 | * | 3/2011 | Reisman | 709/228 |
| 2002/0042836 | A1 | * | 4/2002 | Mallory | 709/232 |
| 2002/0059432 | A1 | * | 5/2002 | Masuda et al. | 709/227 |
| 2002/0073205 | A1 | * | 6/2002 | Mostafa | 709/227 |
| 2002/0083431 | A1 | * | 6/2002 | Machida | 717/174 |

(Continued)

FOREIGN PATENT DOCUMENTS

WO  WO 2005/009019 A2  1/2005
WO  WO-2009043607  4/2009

OTHER PUBLICATIONS

International Search Report, PCT/EP2008/053686, mailing date Dec. 12, 2008.

(Continued)

*Primary Examiner* — Razu A Miah
(74) *Attorney, Agent, or Firm* — Danielle Johnston-Holmes; Micky Minhas

(57) ABSTRACT

A method of transmitting data from a first terminal to a second terminal in a communication network comprising: receiving at the first terminal an data signal determining an identity of the peripheral device; supplying to a data store the identity of the peripheral device; selecting from the data store at least one parameter for processing the data signal based on the identity of the peripheral device; transmitting the data signal from the first terminal to the second terminal; and processing the data signal, wherein the data signal is processed based on the selected parameter.

22 Claims, 2 Drawing Sheets

(56) References Cited

U.S. PATENT DOCUMENTS

| | | | |
|---|---|---|---|
| 2002/0097260 A1* | 7/2002 | Igata | G06F 9/4443 715/738 |
| 2002/0128986 A1* | 9/2002 | Stutz | B41J 2/16547 705/401 |
| 2002/0199039 A1* | 12/2002 | Peterson | G06F 9/4411 710/10 |
| 2003/0026231 A1* | 2/2003 | Lazaridis | G06Q 30/00 370/338 |
| 2003/0033397 A1* | 2/2003 | Gurumoorthy et al. | 709/223 |
| 2003/0046447 A1* | 3/2003 | Kouperchliak et al. | 709/321 |
| 2003/0060218 A1* | 3/2003 | Billerbeck et al. | 455/501 |
| 2003/0066065 A1* | 4/2003 | Larkin | 717/177 |
| 2003/0084132 A1* | 5/2003 | Ohta | 709/221 |
| 2003/0229900 A1* | 12/2003 | Reisman | 725/87 |
| 2003/0233458 A1* | 12/2003 | Kwon | H04L 29/06 709/227 |
| 2004/0015589 A1* | 1/2004 | Isozu | 709/227 |
| 2004/0148362 A1* | 7/2004 | Friedman | 709/217 |
| 2004/0174843 A1* | 9/2004 | Kubler et al. | 370/328 |
| 2004/0193738 A1* | 9/2004 | Natu | G06F 9/4411 710/1 |
| 2004/0204033 A1* | 10/2004 | Yang | 455/552.1 |
| 2004/0210897 A1* | 10/2004 | Brockway | G06F 9/4411 717/174 |
| 2004/0249934 A1* | 12/2004 | Anderson | G06F 8/65 709/224 |
| 2005/0066000 A1* | 3/2005 | Liaw et al. | 709/204 |
| 2005/0076198 A1* | 4/2005 | Skomra et al. | 713/156 |
| 2005/0080973 A1* | 4/2005 | Lee | 710/311 |
| 2005/0270601 A1* | 12/2005 | Rodrigues | H04N 1/00236 358/527 |
| 2006/0004930 A1* | 1/2006 | Patino et al. | 710/16 |
| 2006/0010199 A1* | 1/2006 | Brailean et al. | 709/204 |
| 2006/0034321 A1* | 2/2006 | Paila et al. | 370/464 |
| 2006/0120206 A1* | 6/2006 | Kim | 365/233 |
| 2006/0142058 A1* | 6/2006 | Elias et al. | 455/556.1 |
| 2006/0206605 A1* | 9/2006 | Machida | 709/223 |
| 2007/0002840 A1 | 1/2007 | Song et al. | |
| 2007/0011182 A1 | 1/2007 | Chiu | |
| 2007/0038760 A1* | 2/2007 | Arai | 709/227 |
| 2007/0249401 A1* | 10/2007 | Kim | H04B 7/0452 455/562.1 |
| 2008/0115172 A1* | 5/2008 | Denny et al. | 725/58 |
| 2008/0182514 A1* | 7/2008 | Tamura | 455/41.2 |
| 2008/0295159 A1* | 11/2008 | Sentinelli | 726/6 |
| 2009/0077601 A1* | 3/2009 | Brailean et al. | 725/109 |
| 2009/0089442 A1* | 4/2009 | Jefremov | H04L 65/604 709/228 |
| 2014/0057232 A1* | 2/2014 | Wetmore et al. | 434/236 |
| 2014/0081738 A1* | 3/2014 | Abraham | 705/14.38 |

OTHER PUBLICATIONS

"Foreign Office Action", EP Application No. 08718300.0, (Jun. 14, 2011), 8 pages.

"Foreign Office Action", EP Application No. 08718300.0, (Sep. 16, 2010), 7 pages.

"Written Opinion", Application No. PCT/EP2008/053686, (Apr. 2, 2010), 6 pages.

* cited by examiner

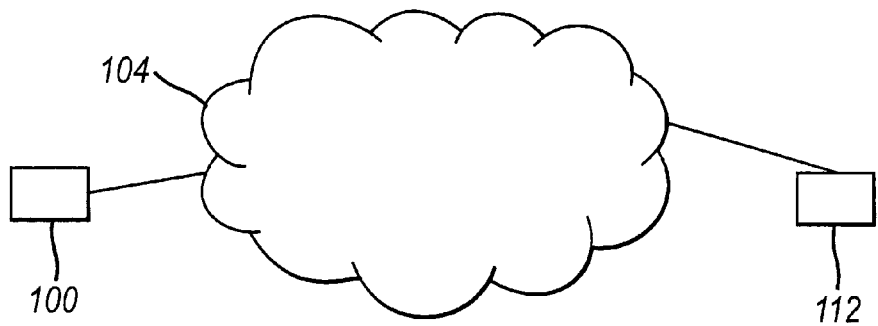
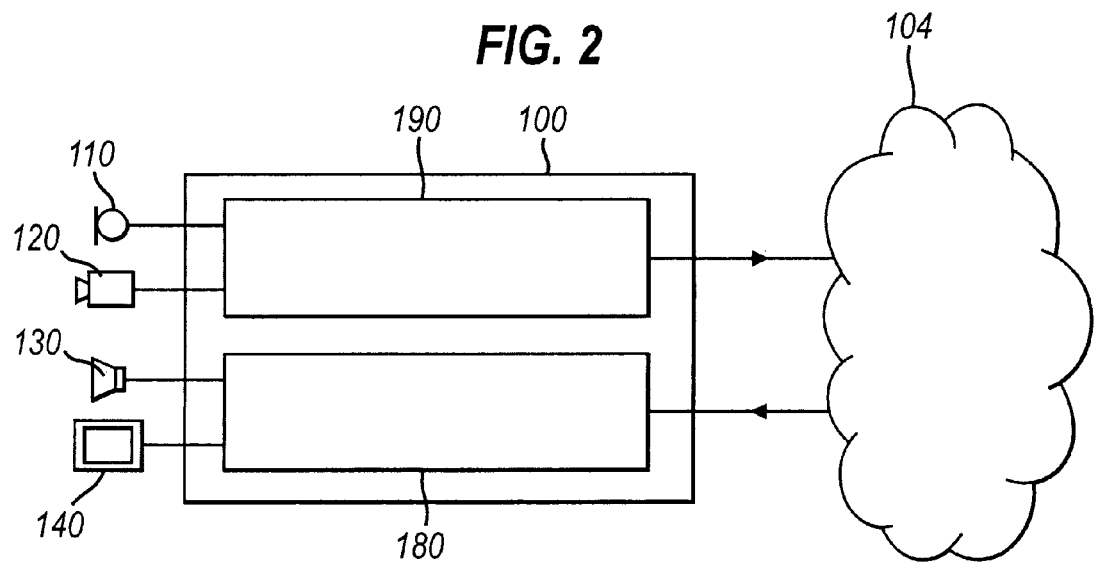
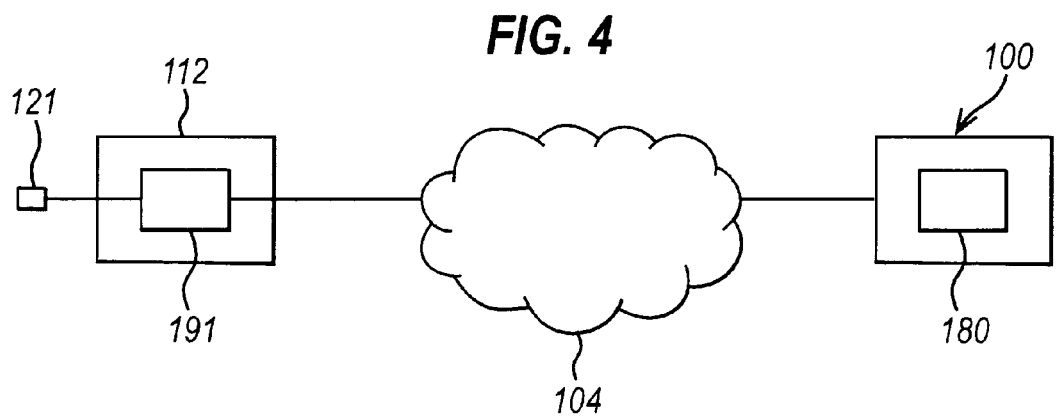

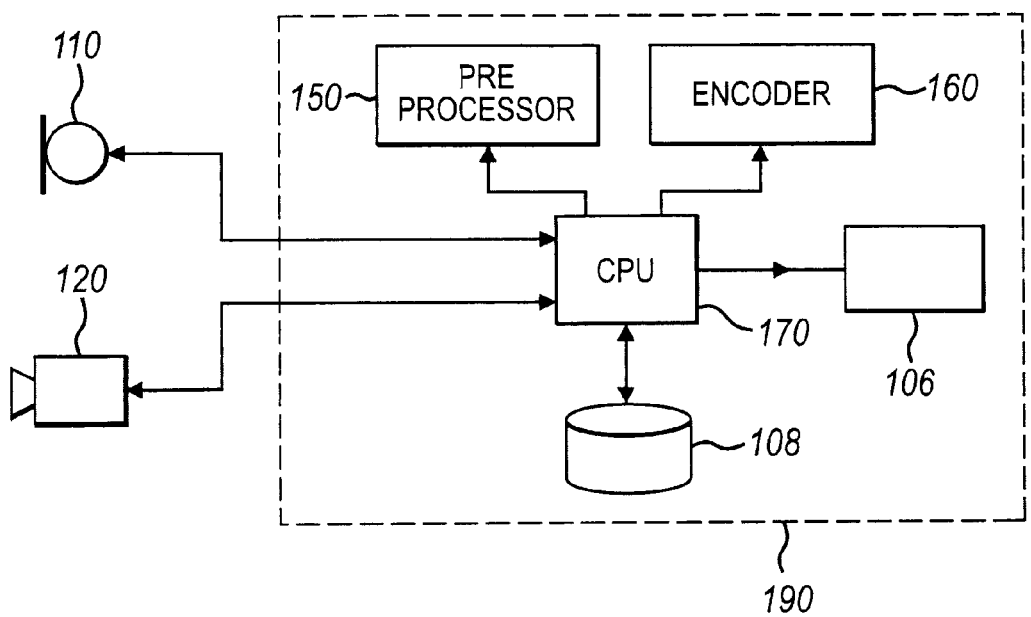
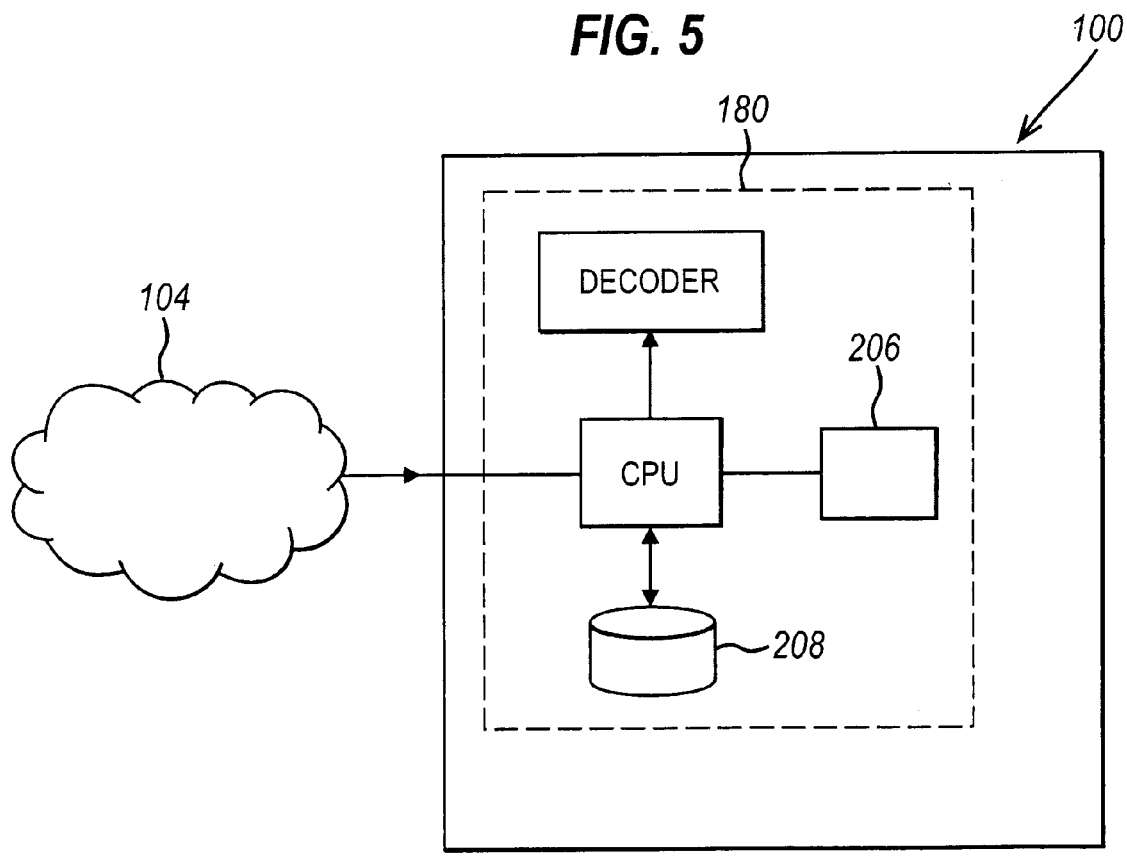

METHOD OF TRANSMITTING DATA IN A COMMUNICATION SYSTEM

RELATED APPLICATION

This application claims priority under 35 U.S.C. §119 or 365 to Great Britain, Application No. 0719233.9, filed Oct. 2, 2007. The entire teachings of the above application are incorporated herein by reference.

TECHNICAL FIELD

The present invention relates to communication systems. More particularly the present invention relates to a method and apparatus for encoding, and transmitting data in a communication system.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as audio or video data is input into an analogue to digital converter at the transmitter of one terminal and converted into a digital signal. The data may be captured by an input device such as a microphone or a video camera connected to the terminal. The digital signal is then encoded by an encoder and placed in data packets for transmission over a channel to the receiver of another terminal.

The manner in which the data captured by the data input device is handled by the terminal is dependent on a number of variables. For example the encoder in the terminal may encode the data differently in dependence on the data rate of the data input into the encoder, the available bandwidth of the communication network, or the available capacity of the central processing unit (CPU) in the terminal.

Adapting the manner in which data is handled at the terminal in dependence on variable conditions allows the system to optimally handle the data for given conditions.

However in some cases, optimizing the handling of data for given conditions may not necessarily give rise to the best manner for handling the data. For example an input device that consumes a large proportion of the CPU capacity may also require that data transmitted from the terminal is encoded at a high data rate. This may not be achieved if the encoding rate is dependent on the available capacity of the CPU.

It is therefore an aim of the present invention to improve the manner in which data is handled by a transmitting terminal in order to improve the quality of the transmitted signal.

SUMMARY

According to a first aspect of the invention there is provided a method of transmitting data from a first terminal to a second terminal in a communication network comprising: receiving at the first terminal a data signal input from a peripheral device connected to the first terminal; determining an identity of the peripheral device; supplying to a data store the identity of the peripheral device; selecting from the data store at least one parameter for processing the data signal based on the identity of the peripheral device; transmitting the data signal from the first terminal to the second terminal; and processing the data signal, wherein the data signal is processed based on the selected parameter.

The step of transmitting the data signal to the second terminal according to the first aspect of the invention may be carried out in any order in relation to the steps of determining the identity of the peripheral device; supplying to the data store the identity of the peripheral device; selecting from the data store the at least one parameter for processing the data signal based on the identity of the peripheral device; and processing the data signal, wherein the data signal is processed based on the selected parameter.

According to a second aspect of the invention there is provided a terminal arranged to transmit data to a receiving terminal via a communication network comprising: an input arranged to receive a data signal input from a peripheral device connected to the transmitting terminal; a data store arranged to store a plurality of parameters; a processor arranged to determine an identity of the peripheral device and to select from the data store at least one parameter for processing the data signal based on the identity of the peripheral device; and a transmitter arranged to transmit the data signal to the receiving terminal.

According to a third aspect of the present invention there is provided a terminal arranged to receive a data signal from a transmitting terminal via a communication network comprising; a receiver arranged to receive the data signal transmitted from the transmitting terminal together with an identity of a peripheral device, wherein the peripheral device is used to input the data signal at the transmitting terminal; a data store arranged to store a plurality of parameters; and a processor arranged to select from the data store at least one parameter for processing the data signal based on the identity of the peripheral device, and to process the data signal based on the selected parameter.

According to a fourth aspect of the present invention there is provided a communication system comprising a first terminal and a second terminal, wherein the first terminal comprises; an input arranged to receive a data signal input from a peripheral device connected to the first terminal, a processor to determine an identity of the peripheral device; and a transmitter arranged to transmit the data signal and the identity of the peripheral device to a second device; and wherein the second terminal comprises; a receiver arranged to receive the data signal and the identity of the peripheral device, a data store arranged to store a plurality of parameters; and a processor arranged to select from the data store at least one parameter for processing the data signal based on the identity of the peripheral device, and to process the data signal based on the selected parameter.

BRIEF DESCRIPTION OF THE DRAWINGS

For a better understanding of the present invention and to show how the same may be carried into effect, embodiments of the present invention will now be described with reference to the following drawings:

FIG. 1 shows a communication network.

FIG. 2 shows a terminal connected to the communication network;

FIG. 3 shows a terminal in accordance with the present invention;

FIG. 4 is a schematic representation of the transmission of data from the second terminal to the first terminal; and FIG. 5 shows the logical connections between the receiving circuitry and the CPU in the first terminal.

DETAILED DESCRIPTION

Reference will first be made to FIG. 1, in which are shown a first terminal 100 and a second terminal 112 connected to a communication network 104. The terminal 100 is arranged to transmit data to the terminal 112 via the communication network 104. In one embodiment of the invention the communications network is a VoIP network provided by the internet. It should be appreciated that even though the exemplifying communications system shown and described in more detail herein uses the terminology of a VoIP network, embodiments of the present invention can be used in any other suitable communication system that facilitates the transfer of data. Embodiments of the invention are particularly suited to asynchronous communication networks such as frame based systems as ATM, BlueTooth and Enhanced Data rates for GSM Evolution (EDGE) networks.

In a preferred embodiment of the invention the VoIP system is a peer to peer communication system, in which a plurality of end users can be connected for communication purposes via a communications structure such as the internet. A peer to peer communication system may also use other protocols to facilitate the transfer of other data such as text images or video. The communications structure is substantially decentralised with regard to communication route switching therein for connecting the end users. That is, the end users can establish their own communication routes through the structure based on exchange of an authorisation certificate (user identity certificates—UIC) to acquire access to the structure. The structure includes an administration arrangement issuing the certificates to the end users. Such a communication system is described in WO 2005/009019.

The terminals 100 and 112 may be, for example, a personal computer, a gaming device, a personal digital assistant, a suitably enabled mobile phone, a television or other device able to connect to the network 104.

FIG. 2 shows the first terminal 100 connected to the network 104. The terminal 100 may be connected to various peripheral devices that are devices that may be connected to a user terminal to expand its functionality. The peripheral devices shown in FIG. 2 are used to provide user interfaces to receive information from and output information to a user of the terminal. In a preferred embodiment of the invention the peripheral devices connected to the terminal include a microphone 110, a camera 120, a loudspeaker 130 and a display screen 140. The interface devices may also include a keyboard (not shown). The terminal 100 may be connected to the network 104 via a cable (wired) connection or a wireless connection.

The terminal 100 includes signal receiving circuitry 180 for receiving signals from the second terminal 112 via the network 104 and signal transmitting circuitry 190 for transmitting signals to the second terminal 112 via the network 104. Similar transmitting and receiving circuitry is also provided in the destination terminal 112 for transmitting data to, and receiving data from, the first terminal 100.

FIG. 3 is a schematic representation of the logical connections between the components of the transmitting circuitry 190 and a Central Processing Unit (CPU) 170 of the terminal. The transmitting circuitry 190 includes the encoder 160, a preprocessor 150, a data store 108 and a post encoding block 106. The transmitting circuitry is shown to be connected to the camera 120 and the microphone 110.

In accordance with an embodiment of the invention the CPU 170 is arranged to control the operation of the components in the transmitting circuitry.

In operation, signals such as video data are input into the encoder 160 from the camera 120. The encoder is arranged to group the bits in the bit stream of the video data into frames representing portions of the signal to be encoded. The frames are then encoded according to an encoding scheme implemented in the encoder. The manner in which the data is encoded may affect the data rate that the video data is transmitted across the network at, and in particular the resolution that the video data may be viewed at when it is received at the destination terminal 112.

The preprocessor 150 may be arranged to apply a preprocessing action on the video data before it is encoded. For example the preprocessor may be arranged to smooth the signal in order to reduce random fluctuations in the signal before it is encoded.

According to an embodiment of the invention, the data store 108 provided in the transmitting circuitry of terminal 100 is arranged to store predetermined parameters for handling data to be transmitted from the terminal. In particular the data store is arranged to store parameters for processing data to be transmitted in dependence on the type of peripheral devices that are connected to the terminal. The parameters are stored in the data store 108 in correspondence with peripheral device identities.

The parameters for handling the data to be transmitted from the terminal 100 are selected in dependence on the identity of the peripheral device that is used to capture the data to be transmitted from the terminal.

According to one embodiment of the invention, when video data is to be transmitted from the terminal 100, the CPU 170 is arranged to retrieve an identity from the camera 120 that captured the video data. The CPU 170 is then arranged to search the data store 108 with the identity of the camera.

If the identity of the camera 120 is stored in the data store 108, the operating parameters for handling the video data that correspond to the identity of the camera 120 are retrieved by the CPU 170. The CPU is then arranged to implement the retrieved parameters to handle the data.

In one embodiment of the invention the identity of the camera 120 stored in the data store 108 may correspond to a parameter of the signal to be transmitted. For example the parameter may relate to either a predetermined data transmission rate, or a resolution rate.

The CPU 170 is arranged to retrieve the predetermined data transmission rate from the data store 108 and to control the bit rate at which the encoder encodes the video data in order to achieve the specified data transmission rate.

In a further alternative embodiment of the invention the preprocessor may be controlled to achieve the specified data transmission rate retrieved from the data store.

In a further embodiment of the invention the identity of the camera may correspond to a parameter to be applied to the signal. For example the parameter may relate to a specific encoding parameter to be applied in the encoder, or a specific smoothing parameter to be applied in the preprocessor.

As such the identity of a high quality camera that is stored in the data store may be used to retrieve processing parameters from the data store 108 that encode the data at a higher bit rate, or transmit a video frame at a higher resolution.

On the other hand the identity of a lower quality camera that is stored in the data store may be used to retrieve processing parameters from the data store 108 that smooth the signal before it is encoded, or encode the signal with fewer bits.

In a further embodiment of the invention the data input into the encoder 160 may be audio data input from a microphone. In this embodiment of the invention the post encoder block 106 may be arranged to apply a processing action after the data has been encoded. For example the post encoder block 106 may be arranged to discard some encoded audio packets from the data stream before the data stream is transmitted. Post encoding methods are known to a person skilled in the art. A post encoding method that discards data packets is described in UK patent application 0705324.2.

According to this embodiment of the invention the CPU 170 may be arranged to control the post encoding block 106 to achieve the specified data transmission rate retrieved from the data store 108. In this case the post encoding block 106 may be controlled to drop a greater, or fewer, number of packets in order to achieve the specified data rate.

In an alternative embodiment of the invention the parameters retrieved from the data store 108 are transmitted together with the data signal to the second terminal 112. In this case the second terminal is arranged to process the signal transmitted from the first terminal 100 according to the parameters transmitted from the second terminal. The parameters transmitted from the first terminal may relate to decoding parameters or post processing parameters.

An alternative embodiment of the invention will now be described with reference to FIGS. 4 and 5.

FIG. 4 is a schematic representation of the transmission of data from the second terminal 112 to the first terminal 100. As shown in FIG. 4 the second terminal 112 comprises transmitting circuitry 191 connected to a peripheral device 121 such as a video camera. The second terminal 112 is arranged to transmit data captured by the peripheral device 121 to the first terminal 100 via the network 104.

Reference is now made to FIG. 5. FIG. 5 shows the logical connections between the receiving circuitry 180 and the CPU 170 in the first terminal. As shown in FIG. 5, the receiving circuitry 180 includes a decoder 260, a post decoding block 250 and a data store 208. The receiving circuitry 180 is shown to be connected to the network 104.

Data signals such as video data are captured by a peripheral device such as the camera 121 connected to the second terminal 112 and transmitted to the first terminal 100 via the network 104 as shown in FIG. 4. The data signals received at the terminal 100 are input into the decoder 260 which is arranged to decode the received data signals.

In accordance with an embodiment of the invention the CPU 170 is arranged to control the operation of the components in the receiving circuitry 180 in dependence on the identity of the peripheral device 121 connected to the second terminal 112.

The data store 208 provided in the receiving circuitry of terminal 100 is arranged to store predetermined parameters for handling data received at the terminal 100. In particular the data store is arranged to store parameters for processing received data in dependence on the type of peripheral device 121 that is connected to the transmitting circuitry 191 of the second terminal 112. The parameters are stored in the data store 208 in correspondence with peripheral device identities.

The parameters for handling the data received from the terminal 112 are selected in dependence on the identity of the peripheral device 121 that is used to capture the data for transmission at the second terminal 112.

According to this embodiment of the invention the transmitting circuitry 191 of the second terminal 112 is arranged to determine the identity of the peripheral device 121 and to transmit the identity of the peripheral device 121 to the first terminal 100 together with the transmitted data. Similarly the first terminal 100 may be arranged to transmit the identity of a peripheral device to the second terminal that is used to capture any data transmitted to the second terminal.

The identity of the peripheral device 121 and data captured by the peripheral device 121 are received at the terminal 100 via the network 104. The CPU 170 of the terminal 100 is arranged to search the data store 208 of the receiving circuitry 180 with the identity of peripheral device 121.

If the identity of the peripheral device 121 is stored in the data store 208 of the first terminal 100, at the first terminal the operating parameters for handling the received data corresponding to the identity of the peripheral device 121 are retrieved from the data store 208. The CPU 170 of the first terminal 100 is then arranged to implement the retrieved parameters to handle the received data.

In one embodiment of the invention the identity of the peripheral device 121 may correspond to a parameter to be applied to the received data signal. For example the parameter may relate to a specific decoding parameter to be applied in the decoder 260, or a specific smoothing parameter to be applied in the post decoding block 206.

According to some embodiments of the invention, if the identity of the peripheral device is not stored in the data stores 108 or 208, or if the identity of peripheral device cannot be determined the CPU 170 is arranged to apply default settings to handle the data to be transmitted. The default settings may be retrieved from the data store 108 or 208.

In one embodiment of the invention the identity of the peripheral device may be determined by querying the peripheral device directly.

In one embodiment of the invention the identity of the peripheral device may relate to the Universal Serial Bus (USB) identity of the device.

In an alternative embodiment of the invention the identity of the peripheral device may be determined from an operating system executed on the terminal connected to the peripheral device.

In a further alternative embodiment of the invention the identity of the peripheral device may be determined from the data captured by the device.

In one embodiment of the invention the identity of the peripheral device may be set by the manufacturer of the device and relate to the model type of the device.

In an alternative embodiment of the invention the identity of the peripheral device may relate to the performance characteristic of the peripheral device. For example the peripheral device may be identified as a high quality device or a low quality device. The performance characteristic of the device may be determined from the characteristics of the data captured by the device.

For example the performance characteristic of the device may be determined by comparing the characteristic of the captured data against a predetermined threshold. If the characteristic of the data is below a predetermined threshold the peripheral device may be identified as a low quality device.

If the data captured by the device is video data, the characteristics of the data may for example relate to the sharpness, contrast or jitter of the data. Alternatively if the data captured by the device is audio data, the characteristics of the data may relate to the frequency response, noise level or noise spectrum of the data.

In an alternative embodiment of the invention the identity of the device may be determined at the second terminal 112 that is arranged to receive the data from the first terminal. In this embodiment of the invention the identity of the device is determined from a characteristic of the data signal transmitted from the first terminal 100.

In one embodiment of the invention the parameters applied to handle the data are implemented throughout the duration of the data transmission.

In accordance with an alternative embodiment of the present invention the parameters applied to handle the data are implemented as initial parameters that are adapted during the course of the transmission in dependence on the varying conditions in the terminal and on the network.

In a further embodiment of the invention the parameters selected from the data store 108 may also be dependent system conditions. System conditions may relate to fixed system conditions such as the power of the CPU, or variable system conditions of the network. In this case different parameters relating to the same peripheral identity device may be applied in dependence on the detected system conditions.

While this invention has been particularly shown and described with reference to preferred embodiments, it will be understood to those skilled in the art that various changes in form and detail may be made without departing from the scope of the invention as defined by the claims.

What is claimed is:

1. A method of transmitting data from a first terminal to a second terminal in a communication network comprising:
    receiving at the first terminal a data signal input from a peripheral device connected to the first terminal, wherein the peripheral device is one of a microphone or a camera;
    determining an identity of the peripheral device at the first terminal;
    supplying to a data store at the first terminal the identity of the peripheral device, the data store mapping peripheral devices to respective processing parameters associated with each peripheral device, each respective processing parameter configured for processing respective data signals from the corresponding peripheral device;
    searching the data store with the identity of the peripheral device and selecting from the data store at least one processing parameter associated with the identity of the peripheral device in the data store, the processing parameter configured for processing the data signal;
    processing the data signal using the at least one processing parameter selected from the data store; and
    transmitting the processed data signal from the first terminal to the second terminal.

2. The method as claimed in claim 1 wherein the step of processing the data signal comprises encoding the data signal according to the selected processing parameter.

3. The method as claimed in claim 1 wherein the step of processing the data signal comprises smoothing the data signal according to the selected processing parameter.

4. The method as claimed in claim 1 wherein the step of processing the data signal comprises discarding parts of the data signal according to the selected processing parameter.

5. The method as claimed in claim 1 wherein the step of processing the data signal comprises setting the resolution of the signal according to the selected processing parameter.

6. The method as claimed in claim 1 wherein the step of processing the data signal comprises setting the data rate of the signal according to the selected processing parameter.

7. The method as claimed in claim 1 wherein the method further comprises:
    detecting a system condition; and
    selecting the at least one processing parameter for processing the data signal from the data store based on the system condition and the identity of the peripheral device.

8. The method as claimed in claim 1 wherein the step of determining an identity of the peripheral device comprises retrieving the identity from the peripheral device.

9. The method as claimed in claim 1 wherein the step of determining the identity of the peripheral device comprises determining the identity from a characteristic of the data signal.

10. The method as claimed in claim 9 wherein the identity of the peripheral device relates to a performance characteristic of the device.

11. The method as claimed in claim 1 wherein the identity of the peripheral device identifies a quality characteristic of the peripheral device.

12. The method as claimed in claim 1, wherein the processing based on the selected processing parameter comprises at least one of controlling the manner in which the data to be transmitted is encoded and applying a pre-processing action before it is encoded.

13. A terminal arranged to transmit data to a receiving terminal via a communication network comprising:
    an input device arranged to receive a data signal input from a peripheral device connected to the transmitting terminal, wherein the peripheral device is one of a microphone or a camera;
    a data store arranged to map peripheral devices to respective processing parameters associated with each peripheral device, each respective processing parameter configured for processing respective data signals from the corresponding peripheral device;
    a processor arranged to:
        determine an identity of the peripheral device;
        search the data store with the identity of the peripheral device; and
        select from the data store at least one processing parameter associated with the identity of the peripheral device in the data store, the processing parameter configured for processing the data signal; and
        process the data signal using the at least one processing parameter selected from the data store; and
    a transmitter arranged to transmit the data signal to the receiving terminal.

14. The terminal as claimed in claim 13 wherein the identity of the peripheral device identifies a quality characteristic of the peripheral device.

15. A terminal arranged to receive a data signal from a transmitting terminal via a communication network comprising:
    a receiver arranged to receive the data signal transmitted from the transmitting terminal together with an identity of a peripheral device, wherein the peripheral device is one of a microphone or a camera and is used to input the data signal at the transmitting terminal;
    a data store arranged to map peripheral devices to respective processing parameters associated with each peripheral device, each respective processing parameter configured for processing respective data signals from the corresponding peripheral device; and
    a processor arranged to:
        search the data store with the identity of the peripheral device;
        select from the data store at least one processing parameter associated with the identity of the peripheral device in the data store, the processing parameter configured for processing the data signal; and
        process the data signal using the at least one processing parameter selected from the data store.

16. The terminal as claimed in claim 15 wherein the identity of the peripheral device identifies a quality characteristic of the peripheral device.

17. A communication system comprising a first terminal and a second terminal, wherein the first terminal comprises:
an input device arranged to receive a data signal input from a peripheral device connected to the first terminal, wherein the peripheral device is one of a microphone or a camera,
a processor to determine an identity of the peripheral device; and
a transmitter arranged to transmit the data signal and the identity of the peripheral device to a second device; and
wherein the second terminal comprises:
a receiver arranged to receive the data signal and the identity of the peripheral device,
a data store arranged to map peripheral devices to respective processing parameters associated with each peripheral device, each respective processing parameter configured for processing respective data signals from the corresponding peripheral device; and
a processor arranged to:
search the data store with the identity of the peripheral device;
select from the data store at least one processing parameter associated with the identity of the peripheral device in the data store, the processing parameter configured for processing the data signal; and
process the data signal based on the selected processing parameter.

18. A method of transmitting data from a first terminal to a second terminal in a communication network comprising:
receiving at the first terminal a data signal input from a peripheral device connected to the first terminal, wherein the peripheral device is one of a microphone or a camera;
determining an identity of the peripheral device at the first terminal;
transmitting the data signal and the identity of the peripheral device from the first terminal to the second terminal;
supplying to a data store at the second terminal the identity of the peripheral device, the data store mapping peripheral devices to respective processing parameters associated with each peripheral device, each respective processing parameter configured for processing respective data signals from the corresponding peripheral device;
searching the data store with the identity of the peripheral device and selecting from the data store at the second terminal at least one processing parameter associated with the identity of the peripheral device in the data store, the processing parameter configured for processing the data signal based on the identity of the peripheral device; and
processing the data signal at the second terminal, wherein the data signal is processed based on the selected processing parameter.

19. The method as claimed in claim 18 wherein the step of processing the data signal at the second terminal comprises decoding the data signal according to the selected processing parameter.

20. The method as claimed in claim 18 wherein the step of processing the data signal at the second terminal comprises smoothing the data signal according to the selected processing parameter.

21. A method of transmitting data from a first terminal to a second terminal in a communication network comprising:
receiving at the first terminal a data signal input from a peripheral device connected to the first terminal, wherein the peripheral device is one of a microphone or a camera;
determining an identity of the peripheral device at the first terminal;
supplying to a data store at the first terminal the identity of the peripheral device, the data store mapping peripheral devices to respective processing parameters associated with each peripheral device, each respective processing parameter configured for processing respective data signals from the corresponding peripheral device;
searching the data store with the identity of the peripheral device and selecting from the data store at least one processing parameter associated with the identity of the peripheral device in the data store, the processing parameter configured for processing the data signal based on the identity of the peripheral device;
processing the data signal using the at least one processing parameter selected from the data store; and
transmitting the processed data signal from the first terminal to the second terminal.

22. A method of transmitting data from a first terminal to a second terminal in a communication network comprising:
receiving at the first terminal a data signal input from a peripheral device connected to the first terminal, wherein the peripheral device is one of a microphone or a camera;
transmitting the data signal from the first terminal to the second terminal;
determining an identity of the peripheral device at the second terminal;
supplying to a data store at the second terminal the identity of the peripheral device, the data store mapping peripheral devices to respective processing parameters associated with each peripheral device, each respective processing parameter configured for processing respective data signals from the corresponding peripheral device;
searching the data store with the identity of the peripheral device and selecting from the data store at least one processing parameter associated with the identity of the peripheral device in the data store, the processing parameter configured for processing the data signal based on the identity of the peripheral device; and
processing the data signal at the second terminal, wherein the data signal is processed based on the selected processing parameter.

* * * * *